US009679029B2

(12) United States Patent
Ayala et al.

(10) Patent No.: US 9,679,029 B2
(45) Date of Patent: Jun. 13, 2017

(54) OPTIMIZING STORAGE CLOUD ENVIRONMENTS THROUGH ADAPTIVE STATISTICAL MODELING

(75) Inventors: Richard Ayala, Medford, NJ (US);
Kavita Chavda, Roswell, GA (US);
Sandeep Gopisetty, Morgan Hill, CA (US); Seshashayee S. Murthy, Yorktown Heights, NY (US); Aameek Singh, University Place, WA (US);
Sandeep M. Uttamchandani, San Jose, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1141 days.

(21) Appl. No.: 12/942,011

(22) Filed: Nov. 8, 2010

(65) Prior Publication Data
US 2012/0116743 A1 May 10, 2012

(51) Int. Cl.
*G06F 17/30* (2006.01)
(52) U.S. Cl.
CPC ............................ *G06F 17/30557* (2013.01)
(58) Field of Classification Search
None
See application file for complete search history.

(56) References Cited

U.S. PATENT DOCUMENTS

| 7,676,594 | B2 | 3/2010 | Fukasawa et al. | |
|---|---|---|---|---|
| 8,260,603 | B2* | 9/2012 | Cherkasova et al. | 703/23 |
| 2003/0126254 | A1 | 7/2003 | Cruickshank, III et al. | |
| 2006/0090163 | A1* | 4/2006 | Karisson et al. | 718/105 |
| 2006/0106819 | A1* | 5/2006 | Dhanadevan et al. | 707/100 |
| 2006/0235664 | A1 | 10/2006 | Vinberg et al. | |
| 2007/0088532 | A1* | 4/2007 | Alvarez et al. | 703/2 |

(Continued)

OTHER PUBLICATIONS

Lublin et al. "The Workload on Parallel Supercomputers: Modeling the Characteristics of Rigid Jobs", J. Parallel Distrib. Comput. 63 (2003) 1105-1122.*

(Continued)

*Primary Examiner* — Omar Fernandez Rivas
*Assistant Examiner* — Robert Brock
(74) *Attorney, Agent, or Firm* — Heslin Rothenberg Farley & Mesiti P.C.; George Blasiak (57) ABSTRACT

Embodiments of the present invention provide an approach for adapting an information extraction middleware for a clustered computing environment (e.g., a cloud environment) by creating and managing a set of statistical models generated from performance statistics of operating devices within the clustered computing environment. This approach takes into account the required accuracy in modeling, including computation cost of modeling, to pick the best modeling solution at a given point in time. When higher accuracy is desired (e.g., nearing workload saturation), the approach adapts to use an appropriate modeling algorithm. Adapting statistical models to the data characteristics ensures optimal accuracy with minimal computation time and resources for modeling. This approach provides intelligent selective refinement of models using accuracy-based and operating probability-based triggers to optimize the clustered computing environment, i.e., maximize accuracy and minimize computation time.

23 Claims, 7 Drawing Sheets

(56) References Cited

U.S. PATENT DOCUMENTS

| | | |
|---|---|---|
| 2007/0198328 A1 | 8/2007 | Fuller et al. |
| 2008/0148270 A1 | 6/2008 | Gopisetty et al. |
| 2009/0300210 A1 | 12/2009 | Ferris |
| 2010/0042720 A1 | 2/2010 | Stienhans et al. |
| 2010/0050172 A1 | 2/2010 | Ferris |
| 2010/0125473 A1 | 5/2010 | Tung et al. |

OTHER PUBLICATIONS

Iqbal et al. "SLA-Driven Dynamic Resource Management for Multi-tier Web Applications in a Cloud", 2010 10th IEEE/ACM International Conference on Cluster, Cloud and Grid Computing.*

Desnoyers et al. "Modellus: Automated Modeling of Complex Data Center Applications", 2008.*

Steve Zhang, Ira Cohen, Moises Goldszmidt, Julie Symons, Armando Fox, Ensembles of Models for Automated Diagnosis of System Performance Problems, Technical Report HPL-2005-3, Hewlett-Packard, Jan. 2005, 10 pages.*

Sandeep Gopisetty et al, Evolution of storage management: Transforming raw data into information. IBM Journal of Research and Development 52(4-5): pp. 341-352 (2008).*

Singh, A.; Uttamchandani, S.; Yin Wang, "Evaluating the Effectiveness of Information Extraction in Real-World Storage Management," Modeling, Analysis and Simulation of Computers and Telecommunication Systems, 2008. MASCOTS 2008. IEEE International Symposium on , vol., No., pp. 1-10, Sep. 8-10, 2008.*

Wang, M., Au, K., Ailamaki, A., Brockwell, A., Faloutsos, C., Ganger, G.R.; Storage device performance prediction with cart models. In: 12th Annual International Symposium on Modeling, Analysis, and Simulation of Computer and Telecommunication Systems, MASCOTS, USA (2004), 8 pages.*

Maitland, J., "Keeping Control Isn't Easy", Chapter 4: Cloud-Based Infrastructure, SearchCloudcomputing.com, 13 pages.

Mell, et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 17 pages.

\* cited by examiner

| MODELING ALGORITHM | CREATION TIME (MINS) | REFINEMENT TIME (MIN) | AVG. ERROR (READ) |
|---|---|---|---|
| LINEAR | 85 | 40 | 68% |
| PIECEWISE LINEAR | 112 | 83 | 49% |
| M5 | 421 | 211 | 34% |
| CART | 477 | 300 | 25% |

FIG. 5

| DEVICE/ VOLUME | OPERATING REGIONS | MODELS | BINDING THRESHOLD |
|---|---|---|---|
| VOL1 | SATURATED | • LINEAR (M1)<br>• PIECEWISE (M2)<br>• CART (M3) | (THROUGHPUT < T1) → M1<br>(T1 < THROUGHPUT < T2) → M2<br>... |
| VOL 2 | LINEAR | LINEAR | ALL |
| ... | | | |

OPTIMIZING STORAGE CLOUD ENVIRONMENTS THROUGH ADAPTIVE STATISTICAL MODELING

TECHNICAL FIELD

The present invention generally relates to software storage and management. Specifically, the present invention relates to statistical modeling based analytics within a clustered computing environment (e.g., a cloud computing environment).

BACKGROUND

The explosive growth in enterprise data-centers to petabyte scale, combined with the growing need of business-critical applications for zero downtime, high performance, on-demand resource allocation, minimal windows for maintenance and resource reallocation, are forcing a change in the way administrators execute their tasks. There is a growing reliance on storage management frameworks that have evolved from collections of raw device configuration, performance and event data, to supporting intelligent wizards that exhaustively search for options and provide step-by-step guidance for decision-making.

Existing approaches for creating information models in Systems Management frameworks are typically non-adapting, i.e., models are created using a standard module such as linear, piece-wise linear, non-linear, etc. These approaches often have some the following limitations: non-scalable in computation time and resources with respect to peta-scale information technology (IT) growth, slow to react to rapid and bursty workload variations, and lower average accuracy as the entire history is maintained as a single model.

Given the growing trend towards dynamic virtualized data centers that require automation/planning it is necessary for algorithms to be "real-time" instead of offline background optimization. For instance, adapting information extraction algorithms to the data after creating non-linear models has a significantly higher overhead as compared to a linear model. Furthermore, algorithms vary in their susceptibility to missing data points in real-world monitoring.

SUMMARY

A first aspect of the present invention provides a method for optimizing a clustered computing environment, comprising: obtaining performance data from a set of operating devices receiving a workload within the clustered computing environment; developing a set of statistical models from the performance data obtained from the set of operating devices; analyzing each of the set of statistical models to determine a computation time and an accuracy for running the workload using each of the set of statistical models; and selecting an optimal model from the set of statistical models for running the workload based on the analyzing.

A second aspect of the present invention provides a system for intelligent network storage planning within a clustered computing environment, comprising: a bus; a processor coupled to the bus; and a memory medium coupled to the bus, the memory medium comprising instructions to: obtain performance data from a set of operating devices receiving a workload within the clustered computing environment; develop a set of statistical models from the performance data obtained from the set of operating devices; analyze each of the set of statistical models to determine a computation time and an accuracy for running the workload using each of the set of statistical models; and select an optimal model from the set of statistical models based on the computation time and the accuracy for running the workload.

A third aspect of the present invention provides a computer program product for intelligent network storage planning within a clustered computing environment, the computer program product comprising a computer readable storage media, and program instructions stored on the computer readable storage media, to: obtain performance data from a set of operating devices receiving a workload within the clustered computing environment; develop a set of statistical models from the performance data obtained from the set of operating devices; analyze each of the set of statistical models to determine a computation time and an accuracy for running the workload using each of the set of statistical models; and select an optimal model from the set of statistical models based on the computation time and the accuracy for running the workload.

A fourth aspect of the present invention provides a method for deploying a system for adaptive statistical modeling within a clustered computing environment, comprising: obtain performance data from a set of operating devices receiving a workload within the clustered computing environment; develop a set of statistical models from the performance data obtained from the set of operating devices; analyze each of the set of statistical models to determine a computation time and an accuracy for running the workload using each of the set of statistical models; and select an optimal model from the set of statistical models based on the computation time and the accuracy for running the workload.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the invention relate to a method and system for a self-adapting information extraction middleware with the ability to use time-series trends and abnormality triggers to update and refine models, create workload tiers and maintain a repository of associated models to enable instant application thereof, and minimize the resource overheads by converging to the most accurate lowest overhead model. In particular, embodiments of the present invention provide an approach for adapting an information extraction middleware for a clustered computing environment (e.g., a Cloud environment) by creating and managing a set of statistical models generated from performance statistics of the clustered computing environment. This approach takes into account the required accuracy in modeling, including computation cost of modeling, to pick the best modeling solution at a given point in time. When higher accuracy is desired (e.g., nearing saturation), the present invention adapts to use an appropriate modeling algorithm. Adapting modeling algorithms to the data characteristics ensures optimal accuracy with minimal computation time and resources for modeling. This approach provides intelligent selective refinement of models using accuracy-based and operating probability-based triggers to optimize the clustered computing environment, i.e., maximize accuracy and minimize computation time.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
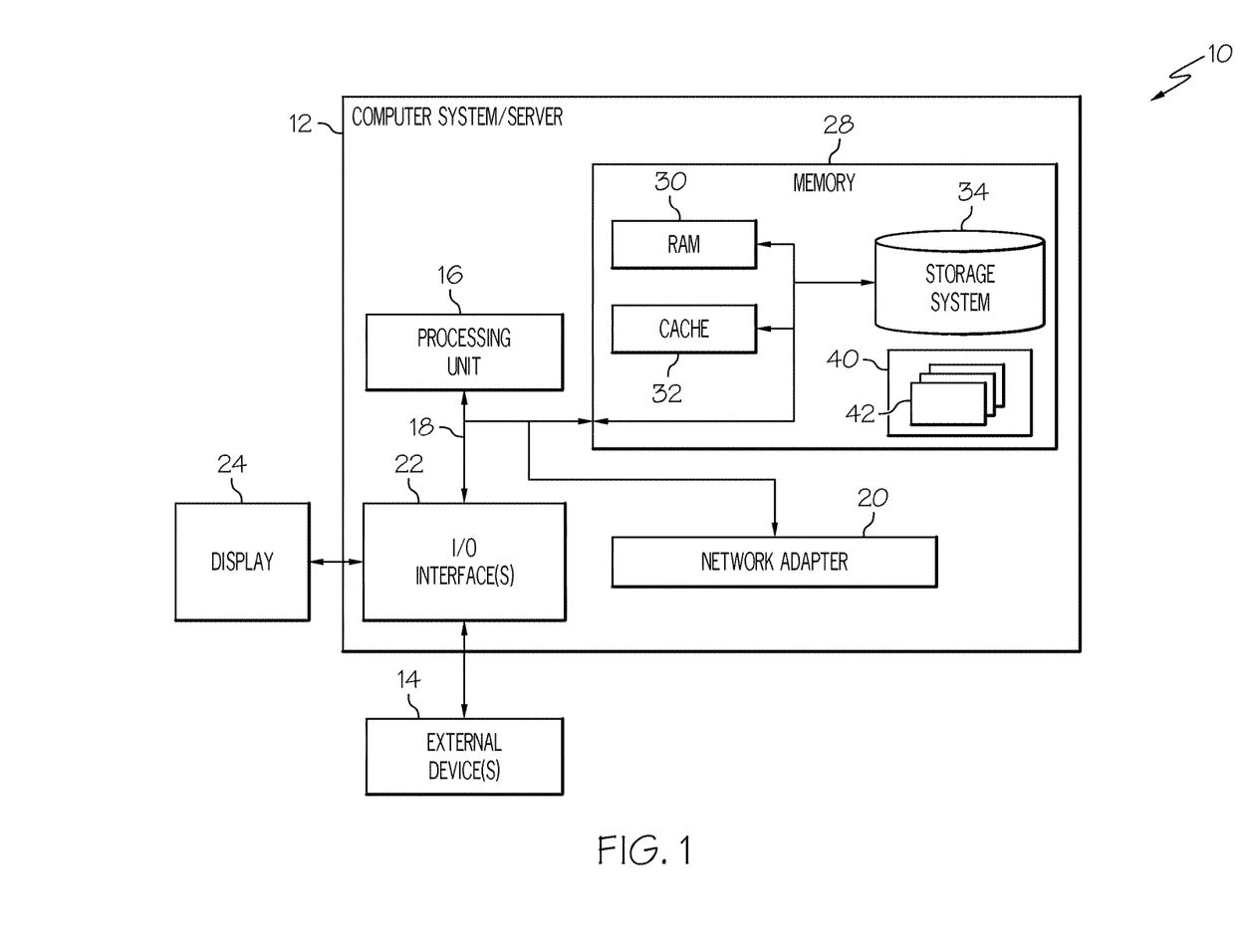
FIG. 1 depicts a Cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
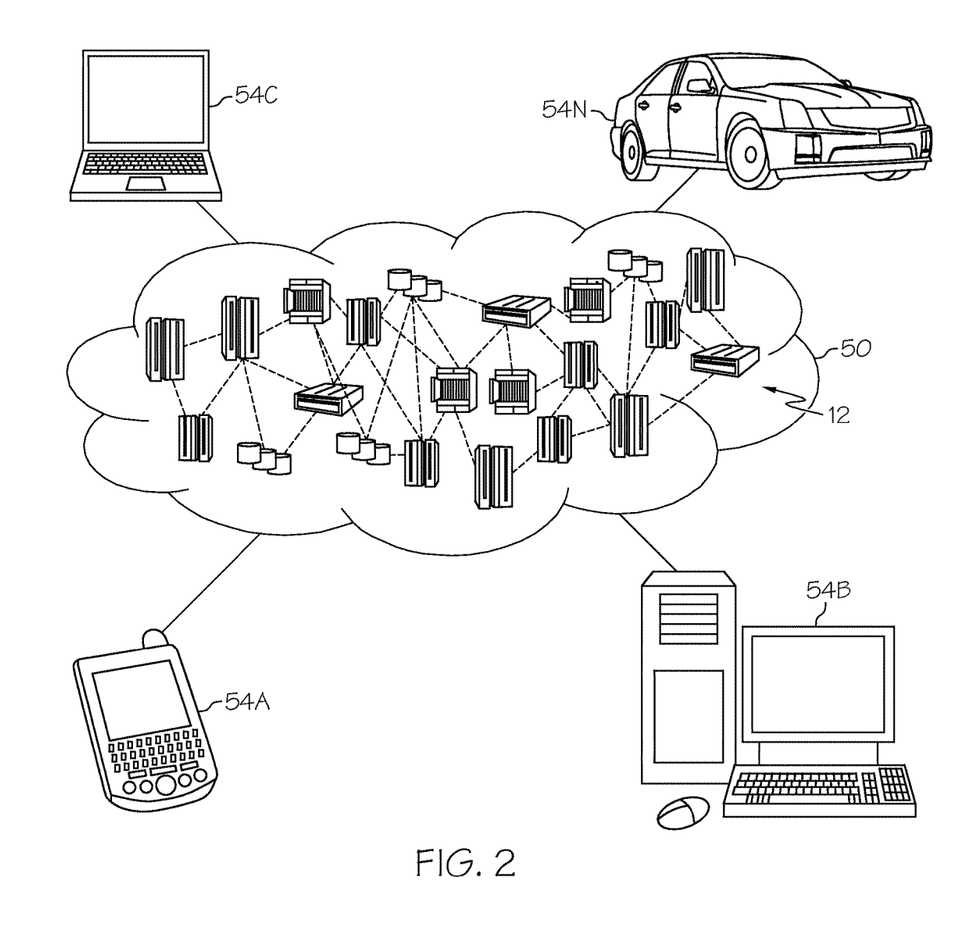
FIG. 2 depicts a Cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
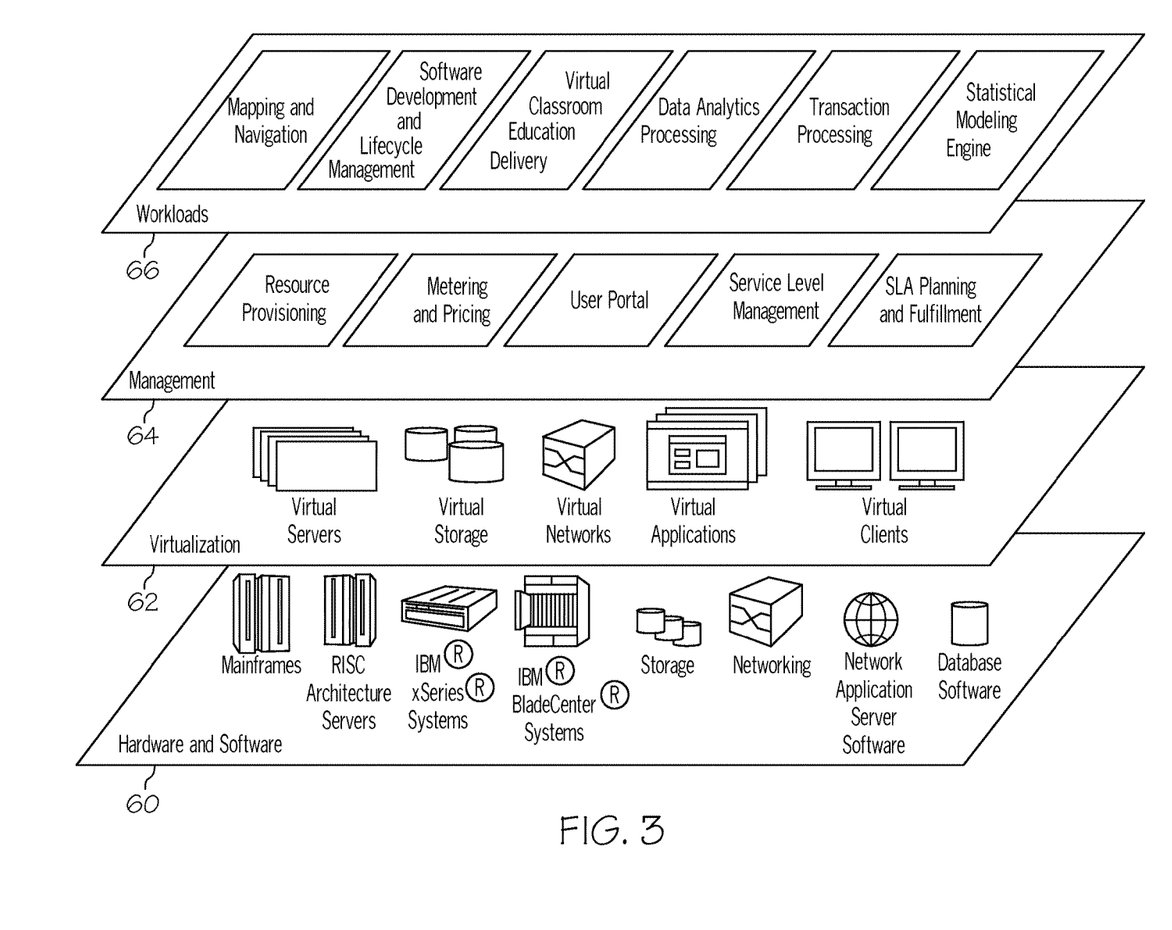
FIG. 3 depicts Cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and statistical modeling engine. As mentioned above, all of the foregoing examples described with respect to FIG. 3 are illustrative only, and the invention is not limited to these examples.

It is understood all functions of the present invention as described herein are typically performed by the node control, which can be tangibly embodied as modules of program code 42 of node control program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
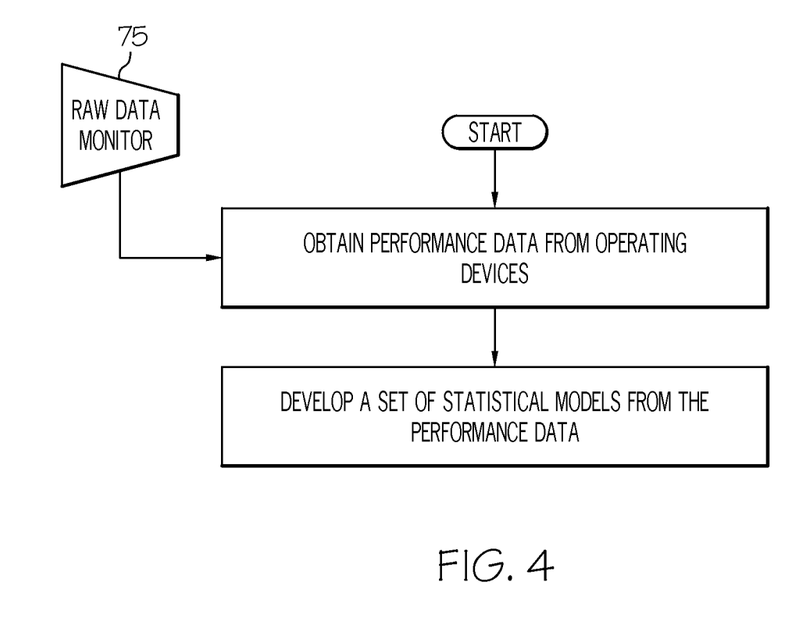
FIG. 4 depicts a method flow diagram according to an embodiment of the present invention.
Figure 5:
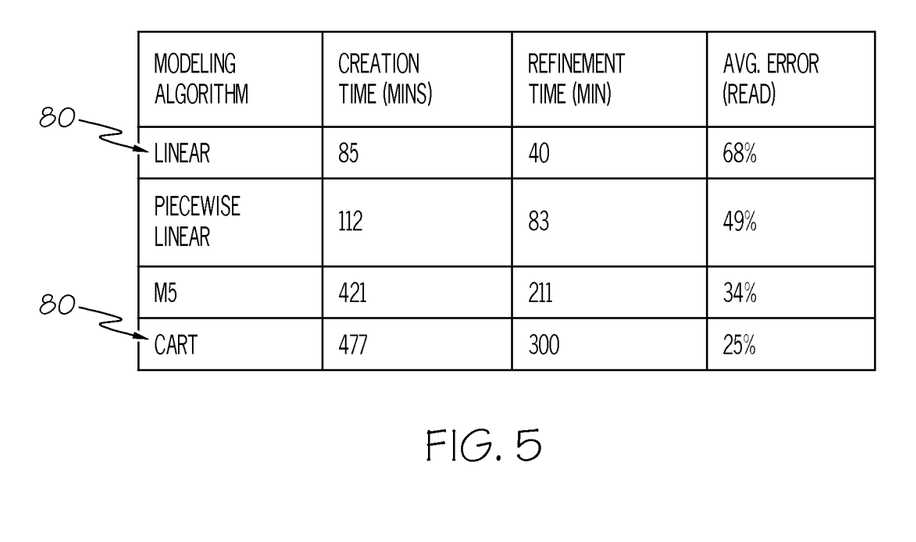
FIG. 5 depicts a set of statistical models according to an embodiment of the present invention.

Referring now to FIGS. 4-5, an approach for optimizing a clustered computing environment (i.e., cloud computing environment 50) will be described in greater detail. As mentioned above, performance statistics of cloud computing environment 50 are continuously received and processed. In this case, performance data is obtained, via raw data monitor 75, from operating devices 54 within cloud computing environment 50 that are receiving a workload. To be useful, this raw data is quantified into a series of statistical models. As shown in FIG. 5, a set of statistical models 80 (e.g., a linear regression, precise linear, classification and regression tree (CART), M5, etc.) are developed from the performance data obtained from operating devices 54. That is, the modeling engine (FIG. 3) detects a device's behavior as a function of input workloads. To accomplish this, the modeling engine is configured to automatically switch between, and test each of a set of statistical models 80 using at least one of the following: multi-model prediction, best practices, data pattern analysis, and accuracy based refinement. The objective function for model switching is to generate a set of statistical models that will have maximum accuracy with minimal computation time for a given condition.

However, each statistical model has varying performance characteristics. As shown in FIG. 5, each model of the set of statistical models 80 is analyzed to determine a computation time (i.e., cost) and an accuracy for running the workload using each of statistical models 80. Here, each statistical model 80 has a different accuracy and computation time measurement. For example, the linear modeling algorithm has a creation time of 85 minutes, a refinement time of 40 minutes, and an average error of 68%. The CART modeling algorithm has a lower average error (25%), but a higher computation time (i.e., creation time of 477 minutes and a refinement time of 300 minutes). Accordingly, each statistical model 80 has performance characteristics that may be seen as tradeoffs depending on various conditions (e.g., workload saturation levels). As such, each statistical model 80 must be analyzed based on dynamic workload conditions to determine a preferred statistical model.

Figure 6:
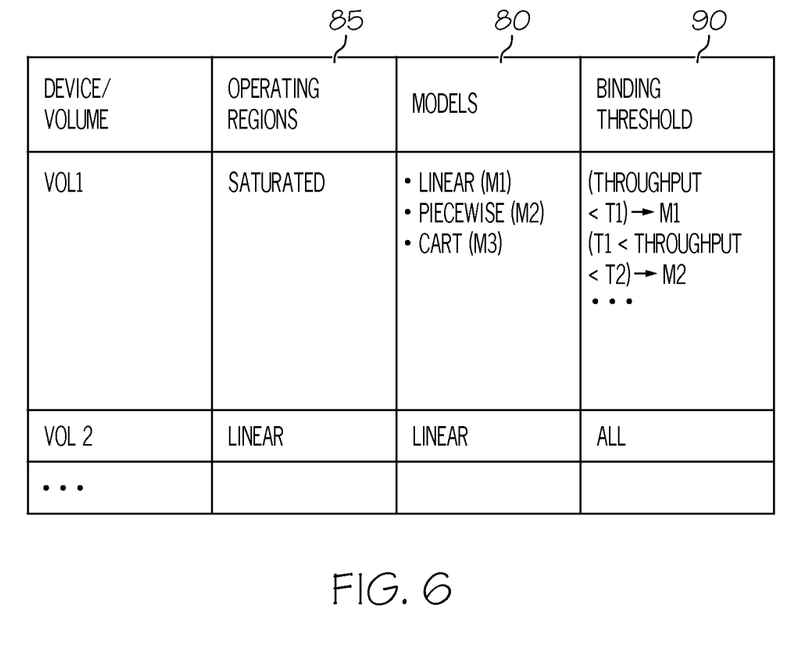
FIG. 6 depicts a set of device operating regions according to an embodiment of the present invention.
Figure 7:
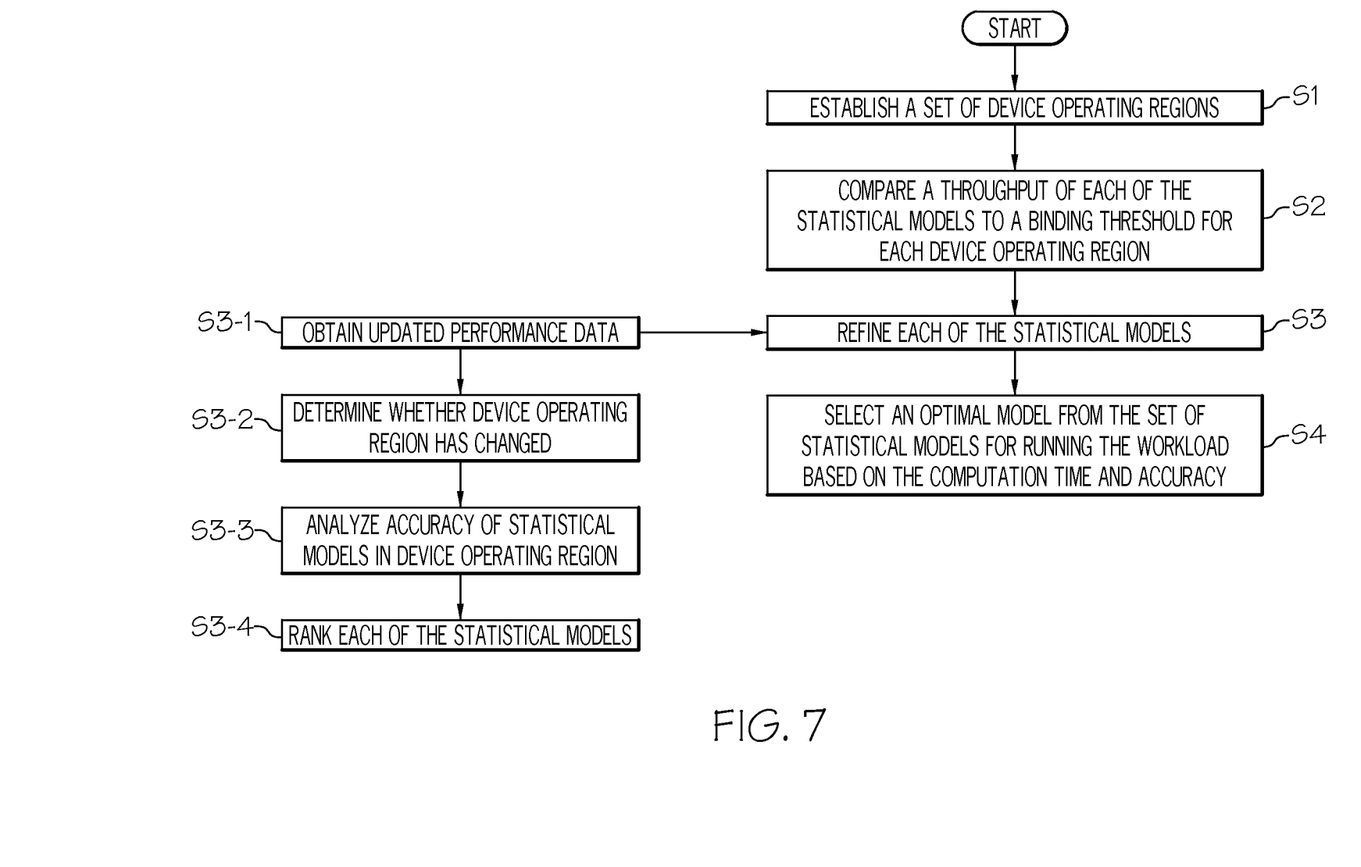
FIG. 7 depicts a method flow diagram according to an embodiment of the present invention.

To accomplish this, as shown in FIGS. 6-7, a set of device operating regions 85 are established, each device operating region 85 corresponding to varying workload saturation levels (e.g. linear, saturated). In this embodiment, each discretized device operating region 85 has a corresponding modeling prediction methodology (e.g. linear regression, CART) to provide higher accuracy modeling predictions specific to each saturation level. Furthermore, as shown in FIG. 6, each device operating region 85 defines the binding threshold 90 (i.e., boundaries of workloads) within which different modeling prediction techniques are applied for a given workload. A throughput of each of the set of statistical models is compared to a binding threshold for each of the set of device operating regions 85. For example, if a throughput of the storage volume is less than T1, the linear regression modeling technique is used to create a statistical model for that volume. If the throughput is between T1 and T2, the piecewise modeling technique is used to create the statistical model. As such, binding threshold 90 defines the boundaries of when to move from one operating region to another, and hence use a different modeling technique.

As shown in FIG. 7, embodiments of the invention provide an approach for intelligent refinement of models based on accuracy and operating probability triggers. As discussed above, in a first step (S1), a set of device operating regions is established. In S2, a throughput of each of the statistical models is compared to a binding threshold for each device operating region. Next, in S3, each of the statistical models is refined. Specifically, updated performance data is obtained from raw data monitor 75 (FIG. 4) in S3-1. In one embodiment, in S3-2 the updated performance data is analyzed to determine whether the device operating region has changed. That is, if the updated performance data indicates workload variations on the operating devices 54, a change in model may be necessary if the device operating region has changed. Furthermore, the updated performance data is analyzed in S3-3 to determine an accuracy of each of statistical models 80 within the device operating region. Even within each device operating region 85, the accuracy of each model is monitored to determine if acceptable performance is being achieved. If not, it may be necessary to change to another statistical model to obtain higher accuracy. Based on this operating region and accuracy analysis, each of statistical models 80 is ranked in S3-4. This ranking allows an optimal model to be selected from set of statistical models 80 for running the workload with optimal accuracy and minimal computation time in S4. This approach takes into account the required accuracy in modeling, as well as computation cost of modeling, to the pick the best modeling solution at a given point in time. It ensures that when higher accuracy is desired (e.g., nearing workload saturation), the solution adapts to use the appropriate statistical model.

While shown and described herein as a statistical modeling solution, it is understood that the invention further provides various alternative embodiments. For example, in one embodiment, the invention provides a computer-readable/useable medium that includes computer program code to enable a computer infrastructure to provide adaptive statistical modeling functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a operating device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide adaptive statistical modeling functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for adaptive statistical modeling functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a operating device, such as computer system 12 (FIG. 1), from a computer-readable medium; (2) adding one or more operating devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a operating device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular operating device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for optimizing a set of operating devices in a clustered computing environment, comprising:
obtaining performance data from a set of operating devices receiving a workload within the clustered computing environment;
developing a set of statistical models from the performance data obtained from the set of operating devices, the developing comprising establishing a set of device operating regions corresponding to varying workload saturation levels;
analyzing each of the set of statistical models to determine a computation time and an accuracy for running the workload at varying workload saturation levels using each of the set of statistical models, wherein the computation time includes a time selected from the group consisting of a statistical model creation time and a statistical model refinement time;
selecting an optimal model from the set of statistical models for running the workload based on the computation time and the accuracy for running the workload at a given workload saturation level, the selecting comprising:
assigning a different statistical model to each particular operating region of the set of operating regions corresponding to each of the workload saturation levels, the different statistical models comprising:
a classification and regression tree (CART) and a M5 regression tree, wherein a workload boundary is defined between at least two operating regions based on a throughput of each of the set of statistical models, wherein:
a first modeling technique is used to create the statistical model in response to a determination that the saturation level indicates that a throughput of each of the set of statistical models is less than a binding threshold of a particular device operating region, and
a second modeling technique is used to create the statistical model in response to a determination that the saturation level indicates that the throughput of the each of the set of statistical models is more than the binding threshold of a particular device operating region; and
running the workload in the clustered computer environment according to the optimal model.

2. The method of claim 1, the developing comprising automatically testing each of the set of statistical models using at least one of the following: multi-model prediction, best practices, data pattern analysis, and accuracy based refinement.

3. The method of claim 1, the analyzing further comprising refining each of the set of statistical models.

4. The method of claim 3, the refining comprising:
obtaining updated performance data from the set of operating devices receiving a workload within the clustered computing environment;
determining whether a device operating region has changed based on the workload;
analyzing an accuracy of each of the statistical models within the device operating region; and
ranking each of the set of statistical models based on the determining and the analyzing.

5. The method of claim 1, the clustered computing environment comprising a cloud computing environment.

6. The method of claim 1, wherein the performance data is substantially continuously received.

7. The method of claim 1, wherein the analyzing is based on dynamic workload conditions.

8. The method of claim 1, wherein the computation time includes a statistical model creation time and a statistical model refinement time.

9. A system for optimizing a clustered computing environment, comprising:
a bus;
a processor coupled to the bus; and
a memory medium coupled to the bus, the memory medium comprising instructions to:
obtain performance data from a set of operating devices receiving a workload within the clustered computing environment;
develop a set of statistical models from the performance data obtained from the set of operating devices, the developing comprising establishing a set of device operating regions corresponding to varying workload saturation levels;
analyze each of the set of statistical models to determine a computation and an accuracy for running the workload at varying workload saturation levels using each of the set of statistical models, wherein the computation time selected from the group consisting of a statistical model creation time and a statistical model refinement time;
select an optimal model from the set of statistical models based on the computation time and the accuracy for running the workload at a given workload saturation level, wherein to select comprises:
to assign a different statistical model to each particular operating region of the set of operating regions corresponding to each of the workload saturation levels, the different statistical models comprising:
at least first and second different statistical models, each of the first and second different statistical model being a statistical model selected from the group consisting of: a classification and regression tree (CART), a M5regression tree, a piecewise linear, and a linear regression, wherein a workload boundary is defined between at least two operating regions based on a throughput of each of the set of statistical models, wherein:
a first modeling technique is used to create the statistical model in response to a determination that the saturation level indicates that a throughput of each of the set of statistical models is less than a binding threshold of a particular device operating region, and
a second modeling technique is used to create the statistical model in response to a determination that the saturation level indicates that the throughput of the each of the set of statistical models is more than the binding threshold of a particular device operating region; and run the workload in the clustered computing environment according to the optimal model.

10. The system of claim 9, the memory medium further comprising instructions to automatically test each of the set of statistical models using at least one of the following: multi-model prediction, best practices, data pattern analysis, and accuracy based refinement.

11. The system of claim 9, the memory medium further comprising instructions to refine each of the set of statistical models.

12. The system of claim 11, the instructions for refining comprising:

obtain updated performance data from the set of operating devices receiving a workload within the clustered computing environment;

determine whether a device operating region has changed based on the workload;

analyze an accuracy of each of the statistical models within the device operating region; and rank each of the set of statistical models based on the determining and the analyzing.

13. The system of claim 9, the clustered computing environment comprising a cloud computing environment.

14. The system of claim 9, wherein the performance data is substantially continuously received.

15. The system of claim 9, wherein the analyzing is based on dynamic workload conditions.

16. A computer program product for adaptive statistical modeling within a clustered computing environment, the computer program product comprising a computer readable storage device, and program instructions stored on the computer readable storage device, to:

obtain performance data from a set of operating devices receiving a workload within the clustered computing environment;

develop a set of statistical models from the performance data obtained from the set of operating devices, the developing comprising establishing a set of device operating regions corresponding to varying workload saturation levels;

analyze each of the set of statistical models to determine a computation time and an accuracy for running the workload saturation levels using each of the set of statistical models, wherein the computation time includes a time selected from the group consisting of a statistical model creation time and a statistical model refinement time;

select an optimal model from the set of statistical models based on the computation time and the accuracy for running the workload at a given workload saturation level, wherein to select comprises:

to assign a different statistical model to each particular operating region of the set of operating regions corresponding to each of the workload saturation levels, the different statistical models comprising:

at least first and second different statistical models, each of the first and second different statistical model being a statistical model selected from the group consisting of: a classification and regression tree (CART), a M5regression tree, a piecewise linear, and a linear regression, wherein a workload boundary is defined between at least two operating regions based on a throughput of each of the set of statistical models, wherein:

a first modeling technique is used to create the statistical model in response to a determination that the saturation level indicates that a throughput of each of the set of statistical models is less than a binding threshold of a particular device operating region, and a second modeling technique is used to create the statistical model in response to a determination that the saturation level indicates that the throughput of the each of the set of statistical models is more than the binding threshold of a particular device operating region; and run the workload in the clustered computing environment according to the optimal model;

wherein the computer readable storage device is not a signal.

17. The computer program product of claim 16, further comprising program instructions stored on the computer readable storage device to automatically test each of the set of statistical models using at least one of the following: multi-model prediction, best practices, data pattern analysis, and accuracy based refinement.

18. The computer program product of claim 16, further comprising program instructions stored on the computer readable storage device to refine each of the set of statistical models.

19. The computer program product of claim 18, the program instructions stored on the computer readable storage device to refine each of the set of statistical models further comprising:

obtain updated performance data from the set of operating devices receiving a workload within the clustered computing environment;

determine whether a device operating region has changed based on the workload;

analyze an accuracy of each of the statistical models within the device operating region; and rank each of the set of statistical models based on the determining and the analyzing.

20. The computer program product of claim 16, the clustered computing environment comprising a cloud computing environment.

21. The computer program product of claim 16, wherein the performance data is substantially continuously received, and wherein the analyzing is based on dynamic workload conditions.

22. A method for deploying a system for adaptive statistical modeling within a clustered computing environment, comprising:

providing an information extraction middleware within a computer infrastructure having functionality to:

obtain performance data from a set of operating devices receiving a workload within the clustered computing environment;

develop a set of statistical models from the performance data obtained from the set of operating devices, the developing comprising establishing a set of device operating regions corresponding to varying workload saturation levels;

analyze each of the set of statistical models to determine a computation time using and an accuracy for running the workload at varying saturation levels using each of the set of statistical models, wherein the computation time includes a time selected from the group consisting of a statistical model creation time and a statistical model refinement time;

select an optimal model from the set of statistical models based on the computation time and the accuracy for running the workload at a given workload saturation level, wherein to select comprises:
to assign a different statistical model to each particular operating region of the set of operating regions corresponding to each of the workload saturation levels, the different statistical models comprising:
at least first and second different statistical models, each of the first and second different statistical model being a statistical model selected from the group consisting of: a classification and regression tree (CART), a M5 regression tree, a piecewise linear, and a linear regression, wherein a workload boundary is defined between at least two operating regions based on a throughput of each of the set of statistical models, wherein:
a first modeling technique is used to create the statistical model in response to a determination that the saturation level indicates that a throughput of each of the set of statistical models is less than a binding threshold of a particular device operating region, and
a second modeling technique is used to create the statistical model in response to a determination that the saturation level indicates that the throughput of the each of the set of statistical models is more than the binding threshold of a particular device operating region; and
run the workload in the clustered computing environment according to the optimal model.

23. The method of claim 22, the clustered computing environment comprising a cloud computing environment.

* * * * *

UNITED STATES PATENT AND TRADEMARK OFFICE
CERTIFICATE OF CORRECTION

PATENT NO. : 9,679,029 B2  
APPLICATION NO. : 12/942011  
DATED : June 13, 2017  
INVENTOR(S) : Ayala et al.

Page 1 of 1

It is certified that error appears in the above-identified patent and that said Letters Patent is hereby corrected as shown below:

In the Claims

Column 14, Line 62: Claim 22, Delete "computation time using and an accuracy" and insert
-- computation time and an accuracy --

Signed and Sealed this
Twenty-second Day of August, 2017

Joseph Matal
*Performing the Functions and Duties of the
Under Secretary of Commerce for Intellectual Property and
Director of the United States Patent and Trademark Office*